US012567243B2

(12) United States Patent
Shieh et al.

(10) Patent No.: US 12,567,243 B2
(45) Date of Patent: Mar. 3, 2026

(54) METHOD FOR OPTIMIZING DATA TO BE USED TO TRAIN OBJECT RECOGNITION MODEL, METHOD FOR BUILDING OBJECT RECOGNITION MODEL, AND METHOD FOR RECOGNIZING AN OBJECT

(71) Applicant: Linker Vision Co., Ltd., Taipei City (TW)

(72) Inventors: Paul Yuan-Bao Shieh, Taipei City (TW); Yi-Hsuan Chen, Taipei City (TW); Thiam-Sun Pang, Taipei City (TW); Chia-I Cheng, Taichung City (TW); Hung-Yu Chien, Keelung City (TW); Hsin-Yu Chang, Taichung City (TW)

(73) Assignee: LINKER VISION CO., LTD., Taipei City (TW)

( * ) Notice: Subject to any disclaimer, the term of this patent is extended or adjusted under 35 U.S.C. 154(b) by 314 days.

(21) Appl. No.: 18/461,739

(22) Filed: Sep. 6, 2023

(65) Prior Publication Data

US 2024/0282083 A1 Aug. 22, 2024

(30) Foreign Application Priority Data

Feb. 20, 2023 (TW) ................................. 112106080

(51) Int. Cl.
*G06V 10/774* (2022.01)
*G06V 10/762* (2022.01)
*G06V 10/98* (2022.01)

(52) U.S. Cl.
CPC .......... *G06V 10/774* (2022.01); *G06V 10/762* (2022.01); *G06V 10/98* (2022.01)

(58) Field of Classification Search
CPC ..... G06V 10/774; G06V 10/762; G06V 10/98
See application file for complete search history.

(56) References Cited

U.S. PATENT DOCUMENTS 11,042,814 B2 * 6/2021 Gou ................... G06Q 30/0204

FOREIGN PATENT DOCUMENTS

| CN | 112654999 A | 4/2021 |
| CN | 113255714 A | 8/2021 |
| CN | 113971741 A | 1/2022 |

OTHER PUBLICATIONS

Wigness, Maggie, and Steven Gutstein. "On the Impacts of Noise from Group-Based Label Collection for Visual Classification." 2017 16th IEEE International Conference on Machine Learning and Applications (ICMLA). IEEE, 2017. (Year: 2017).*

(Continued)

*Primary Examiner* — Stephen R Koziol
*Assistant Examiner* — Benedict E Lee
(74) *Attorney, Agent, or Firm* — HSML P.C.

(57) ABSTRACT

A method for evaluating data to be used to train an object recognition model is to be implemented by a computing device. The computing device stores a plurality of training datasets respectively related to a plurality of images, and each training dataset includes a plurality of entries of training data. The method includes steps of: obtaining, for each image, at least one target area and at least one target property that are related to the image based on the entries of training data; creating, for each image, a training material that includes the image, and the at least one target area and the at least one target property both related to the image; and obtaining at least three object recognition models based on the training materials that are created respectively for the images using at least one machine learning algorithm.

14 Claims, 6 Drawing Sheets

(56)               References Cited

OTHER PUBLICATIONS

Search Report appended to an Office Action, which was issued to
Taiwanese counterpart application No. 112106080 by the TIPO on
Mar. 26, 2024, with an English translation thereof (2 pages).

\* cited by examiner

601 — Obtaining object number in image

602 — Grouping training areas, and obtaining group number

603 — Group number = object number?

No

Yes

604 — Defining target area

605 — Obtaining target property for each object

701     For each image, creating training material

702     Obtaining object recognition models

703     Storing object recognition models

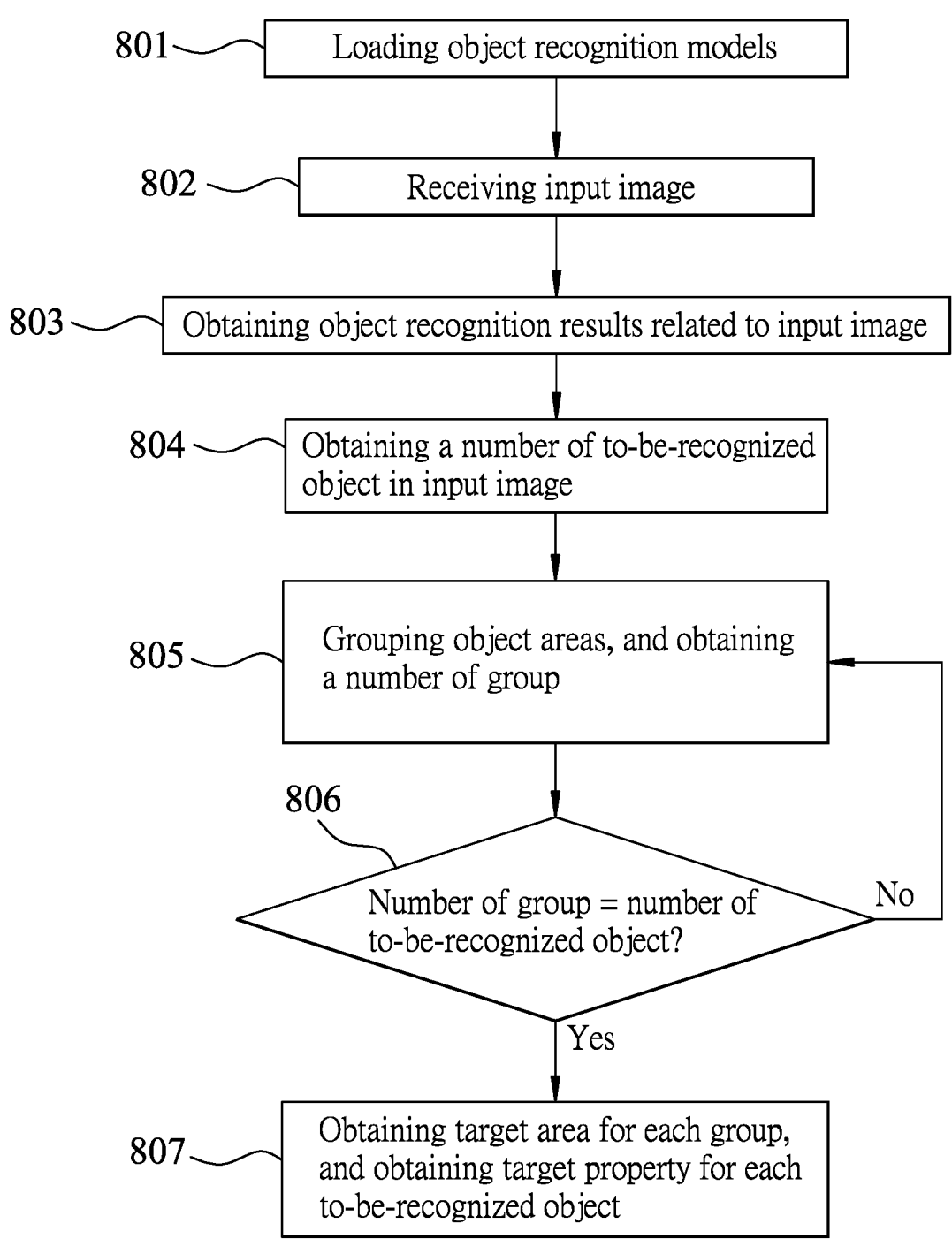

801 — Loading object recognition models

802 — Receiving input image

803 — Obtaining object recognition results related to input image

804 — Obtaining a number of to-be-recognized object in input image

805 — Grouping object areas, and obtaining a number of group

806 — Number of group = number of to-be-recognized object?

No

Yes

807 — Obtaining target area for each group, and obtaining target property for each to-be-recognized object

FIG. 5

METHOD FOR OPTIMIZING DATA TO BE USED TO TRAIN OBJECT RECOGNITION MODEL, METHOD FOR BUILDING OBJECT RECOGNITION MODEL, AND METHOD FOR RECOGNIZING AN OBJECT

CROSS-REFERENCE TO RELATED APPLICATION

This application claims priority to Taiwanese Invention Patent Application No. 112106080, filed on Feb. 20, 2023.

FIELD

The disclosure relates to a method of machine learning, and more particularly to a method for optimizing data to be used to train an object recognition model, a method for building an object recognition model, and a method for recognizing an object.

BACKGROUND

Artificial intelligence has developed rapidly in recent years, and machine learning and deep learning have contributed to the maturity of image recognition technology, which may be used for facial recognition, intruder detection, license plate recognition, etc. Machine learning may be subdivided into supervised learning and unsupervised learning; the difference between the two resides in whether the training data used for model training is labeled or not. The quality of the model trained through supervised learning depends on the completeness and consistency of the training data, and if the training data is labeled incorrectly, the accuracy of the model may be greatly affected. A conventional method for evaluating the correctness of the labeled training data is done manually (i.e., by naked eye); however, when dealing with a large amount of training data, manual evaluation may be time-consuming and labor-intensive.

SUMMARY

Therefore, an object of the disclosure is to provide a method for building an object recognition model that can alleviate at least one of the drawbacks of the prior art.

According to the disclosure, an optimizing method for optimizing data to be used to train an object recognition model is to be implemented by a computing device. The computing device stores a plurality of entries of training data related to an image, where each of the entries of training data includes at least one training area respectively marked on at least one object included in the image. The method includes steps of: obtaining an amount of the at least one object based on the entries of training data; obtaining at least one group by grouping the training areas that are included in the entries of training data using a data clustering algorithm, and obtaining an amount of the at least one group; determining whether the amount of the at least one group is equal to the amount of the at least one object; and when determining that the amount of the at least one group is equal to the amount of the at least one object, for each one of the at least one group, obtaining a target area based on the training areas that are grouped to the one of the at least one group, where the target area is associated with one of the at least one object that corresponds to the training areas grouped to the one of the at least one group.

According to the disclosure, a building method for building an object recognition model is to be implemented by a computing device. The computing device stores a plurality of training datasets respectively related to a plurality of images, where each one of the training datasets includes a plurality of entries of training data related to one of the images that is related to the one of the training datasets, each of the entries of training data includes at least one training area respectively marked on at least one object included in a corresponding one of the images, and at least one object property respectively associated with the at least one object included in the corresponding one of the images. The method includes steps of, for each one of the images: obtaining an amount of the at least one object that is included in the image based on the entries of training data that are included in a corresponding one of the training datasets related to the image; obtaining at least one group by grouping the training areas that are included in the entries of training data included in the corresponding one of the training datasets using a data clustering algorithm, and obtaining an amount of the at least one group that is related to the image; determining whether the amount of the at least one group that is related to the image is equal to the amount of the at least one object that is included in the image; when determining that the amount of the at least one group is equal to the amount of the at least one object, for each one of the at least one group that is related to the image, obtaining a target area based on the training areas that are grouped to the one of the at least one group related to the image, where the target area is associated with one of the at least one object that corresponds to the training areas grouped to the one of the at least one group; after obtaining at least one target area respectively associated with the at least one object that is included in the image, for each of the at least one object that is included in the image, obtaining a target property that is associated with the one of the at least one object included in the image based on the object properties that are included in the entries of training data included in the corresponding one of the training datasets and that are associated with the one of the at least one object included in the image; and creating a training material that includes the image, and the at least one target area and the at least one target property both respectively associated with the at least one object that is included in the image. The method further includes a step of obtaining at least three object recognition models based on the training materials that are created respectively for the images using at least one machine learning algorithm.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 5 is a flow chart of a recognizing method for recognizing an object using the object recognition model according to an embodiment of the disclosure.

DETAILED DESCRIPTION

Figure 1:
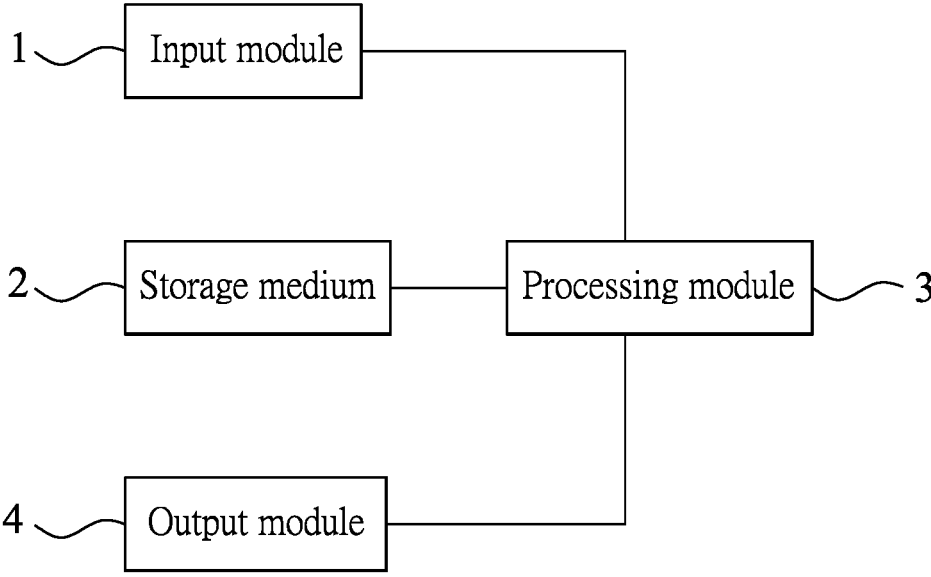
FIG. 1 is a block diagram illustrating a computing device for implementing an optimizing method for optimizing data to be used to train an object recognition model according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computing device for implementing an optimizing method for optimizing data to be used to train an object recognition model according to an embodiment of the disclosure is provided. The computing device includes an input module 1, a storage medium 2, an output module 4, and a processing module 3 that is electrically connected to the input module 1, the storage medium 2, and the output module 4. The computing device may be implemented as a server, a personal computer, a laptop, a tablet, a smartphone, etc. The input module 1 may be implemented as one of a keyboard, a mouse, a touch pad, a touchscreen, any combination thereof, or a universal serial bus (USB). The output module 4 may be implemented as a screen. The storage medium 2 may be embodied using computer-readable storage medium such as hard disk drive(s), random access memory (RAM), read only memory (ROM), programmable ROM (PROM), flash memory, etc. The processing module 3 may be, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or a system on a chip (SoC), etc.

The storage medium 2 stores a plurality of training datasets respectively related to a plurality of images, and an error range for evaluating a user input. Each of the images has one or more objects that needs to be marked. Each one of the training datasets includes a plurality of entries of training data related to one of the images that is related to the one of the training datasets. Each of the entries of training data includes at least one training area respectively marked on at least one of the one or more objects (hereinafter referred to as "at least one marked object") included in a corresponding one of the images, and at least one object property respectively associated with the at least one marked object included in the corresponding one of the images. Each of the at least one training area is defined by at least two sets of training coordinates.

Figure 6:
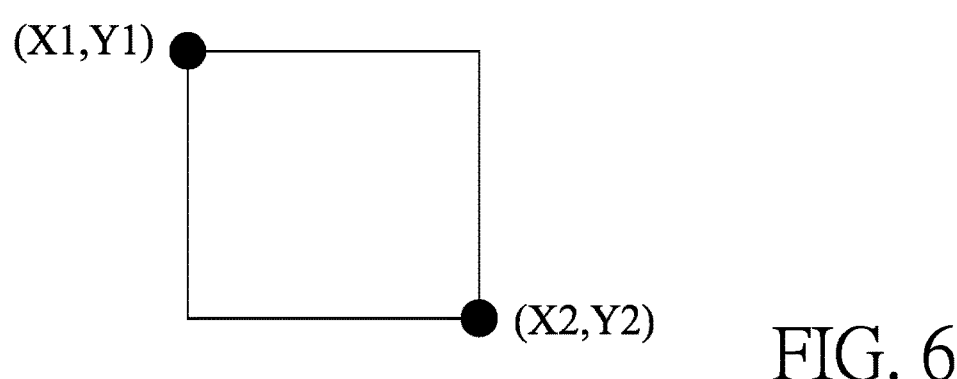
FIGS. 6 to 8 are schematic views illustrating different arrangement of two or more sets of training coordinates that define a training area in different embodiments of the disclosure.
Figure 7:
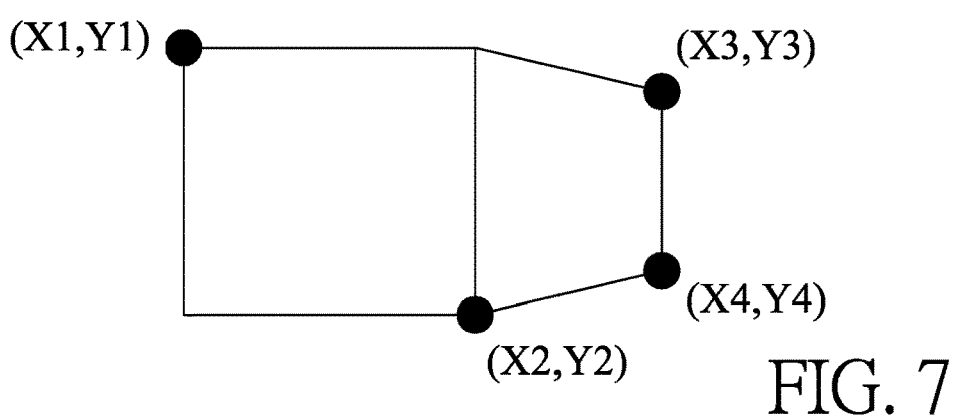
Figure 8:
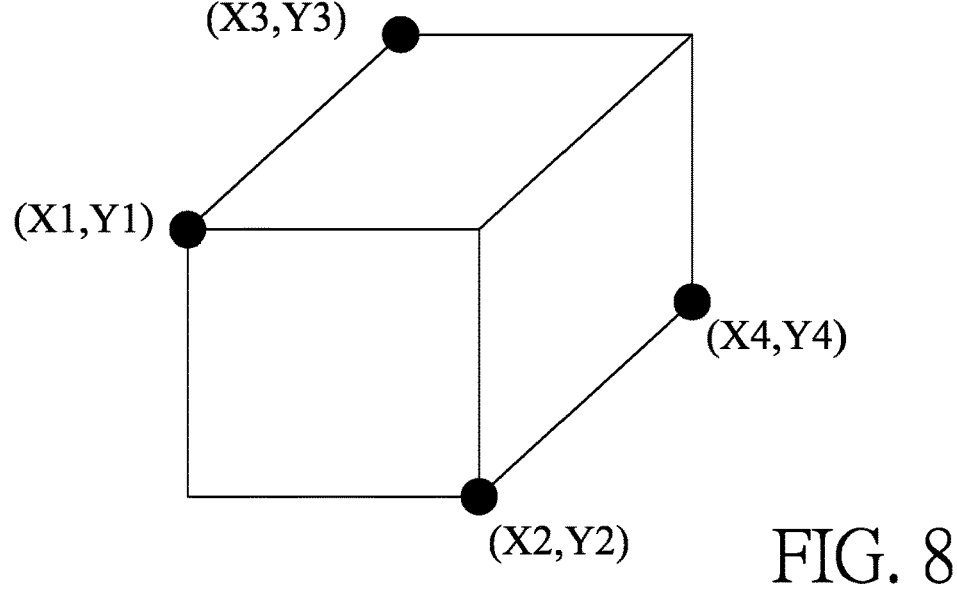

Further referring to FIGS. 6 to 8, in one embodiment as shown in FIG. 6, the at least two sets of training coordinates includes two sets of training coordinates (X1,Y1) and (X2, Y2) for defining the training area (i.e., the square in FIG. 6). In one embodiment as shown in FIG. 7, the at least two sets of training coordinates includes four sets of training coordinates (X1,Y1), (X2,Y2), (X3,Y3) and (X4,Y4) for defining the training area (i.e., the union of the areas that are enclosed by the solid lines in FIG. 7). In one embodiment as shown in FIG. 8, the at least two sets of training coordinates includes four sets of training coordinates (X1,Y1), (X2,Y2), (X3,Y3) and (X4,Y4) for defining the training area (i.e., the union of the areas that are enclosed by the solid lines in FIG. 8). However, the disclosure is not limited to the abovementioned examples.

Figure 2:
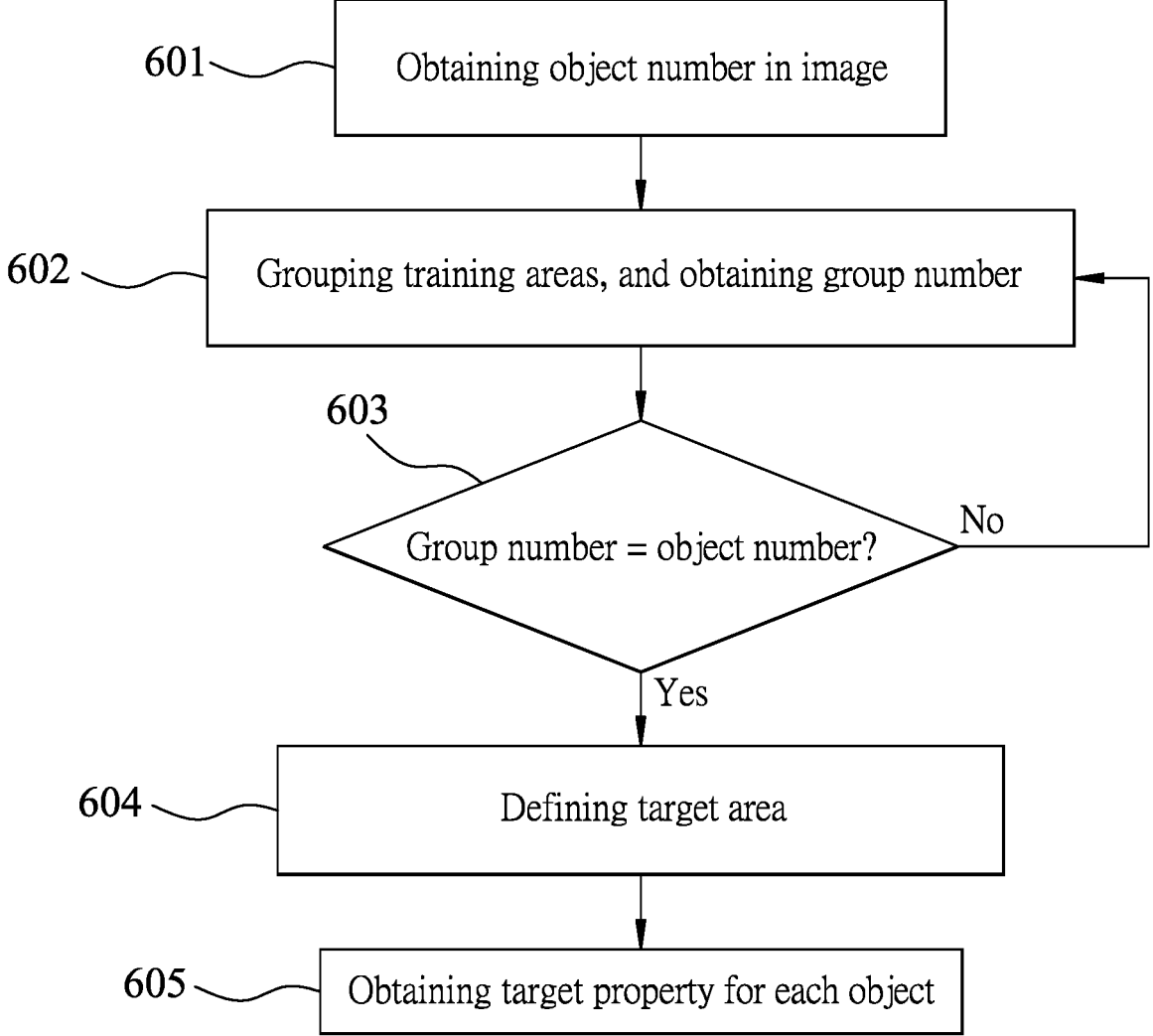
FIG. 2 is a flow chart of the optimizing method according to an embodiment of the disclosure.

Further referring to FIG. 2, the optimizing method for optimizing data to be used to train an object recognition model is related to processing and optimizing the training datasets. Each of the entries of training data is marked by, for example, an experienced trainer. Since the optimizing method is performed for each of the training datasets in a similar manner, in the following description, only one of the images, a corresponding one of the training datasets that is related to the image, and the entries of training data included in the corresponding one of the training datasets are used to describe the optimizing method in detail for the sake of brevity. A flow of the optimizing method includes steps 601 to 605.

In step 601, the processing module 3 obtains a number of the one or more objects included in the image (hereinafter referred to as "object number") based on the entries of training data. To describe in further detail, the processing module 3 obtains, for each of the entries of training data, a number of the at least one training area that is included in the entry of training data (hereinafter referred to as "area number"), and then takes a mode of the area numbers obtained respectively for the entries of training data as the object number.

In step 602, the processing module 3 obtains at least one group by grouping the training areas that are included in the entries of training data using a data cluster algorithm, and then obtains a number of the at least one group (hereinafter referred to as "group number"). In this embodiment, the data clustering algorithm is density-based spatial clustering of applications with noise (DBSCAN), and the processing module 3 uses the DBSCAN to group the training areas that are included in the entries of training data based on a set of two parameters to obtain the at least one group. The set of two parameters includes a radius and a minimum number of samples, and is given a set of two values.

In step 603, the processing module 3 determines whether the group number is equal to the object number. When the processing module 3 determines that the group number is equal to the object number, the flow of the optimizing method proceeds to step 604; otherwise, the flow of the optimizing method goes back to step 602, in which the processing module 3 obtains at least one group again by regrouping the training areas that are included in the entries of training data using the DBSCAN based on the set of two parameters which is given a different set of two values, and then obtains another group number of the at least one group thus obtained, and step 603 is repeated to determine whether the group number obtained most recently in step 602 is equal to the object number. It should be noted that, when repeating step 602, the two values given respectively to the two parameters may both be changed or only one of them is changed. As such, the processing module 3 may try different sets of two values given to the two parameters for grouping the training areas until the group number obtained most recently in step 602 is equal to the object number.

In step 604, for each one of the at least one group obtained most recently in step 602, the processing module 3 obtains at least two sets of target coordinates based on the training coordinates corresponding to the training areas that are grouped to the group, and then defines a target area based on the at least two sets of target coordinates. The target area is associated with one of the one or more objects that corresponds to the training areas grouped to the group (i.e., the target area is associated with the group). To describe in further detail, the processing module 3 obtains the at least two sets of target coordinates by averaging the training coordinates corresponding to the training areas that are grouped to the group. For example, assuming that the group includes three training areas, where the first training area is defined by two sets of training coordinates (X1,Y1) and (X2,Y2), the second training area is defined by two sets of training coordinates (X5,Y5) and (X6,Y6), and the third training area is defined by two sets of training coordinates (X7,Y7) and (X8,Y8), then the target area that is associated with the group is defined by two sets of target coordinates ((X1+X5+X7)/3, (Y1+Y5+Y7)/3) and ((X2+X6+X8)/3, (Y2+Y6+Y8)/3).

In step 605, for each of the at least one marked object, the processing module 3 obtains a target property associated with the object based on the object properties that are included in the entries of training data and that are associated with the object. To describe in further detail, the processing module 3 obtains the target property associated with the object by taking a mode of the object properties that are associated with the object. For example, assuming that there are three entries of training data in the training dataset, where the object property included in the first training data indicates that the object is a vehicle, the object property included in the second training data also indicates that the object is a vehicle, and the object property included in the third training data indicates that the object is a pedestrian, the mode of the three object properties that are associated with the object is vehicle, and thus the target property is defined to be a vehicle.

Figure 3:
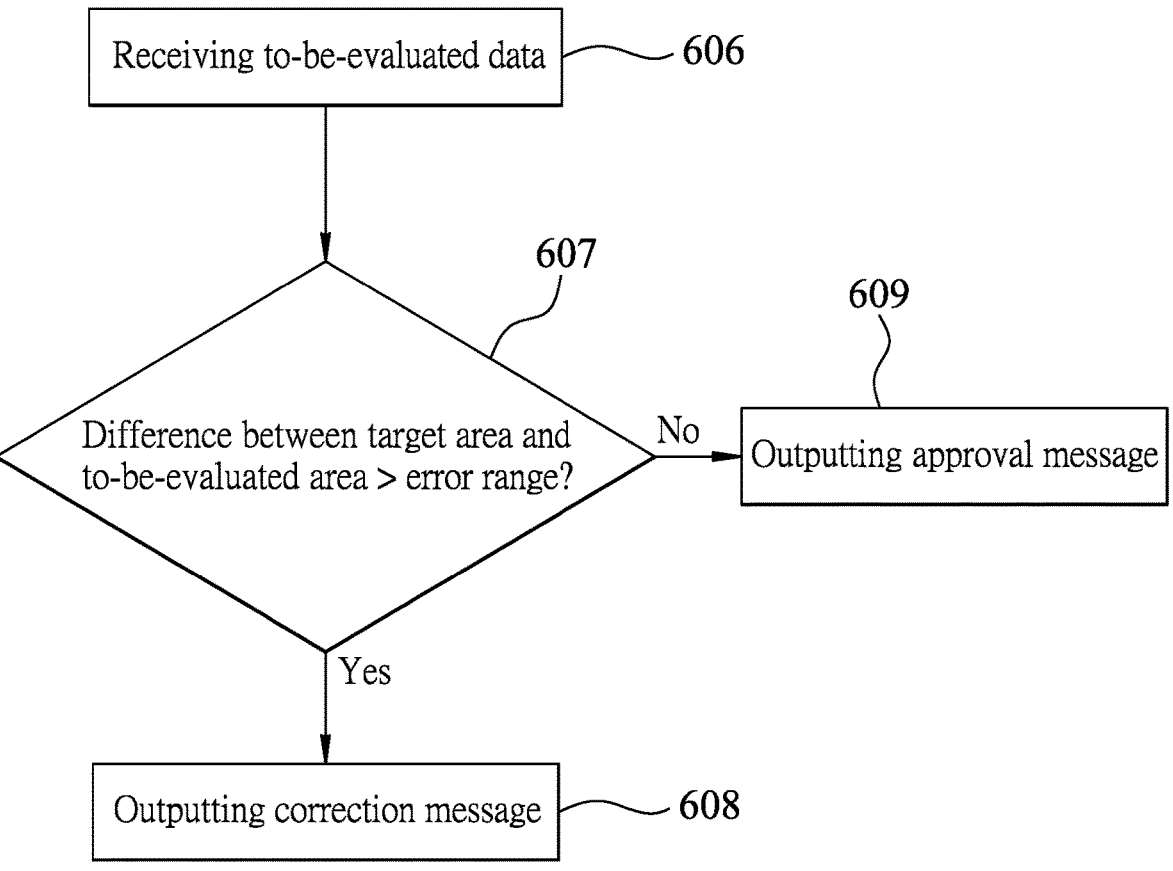
FIG. 3 is a flow chart of an evaluating method for evaluating data to be used to train an object recognition model according to an embodiment of the disclosure.

Referring to FIG. 3, an evaluating method for evaluating data to be used to train an object recognition model is implemented for evaluating an entry of to-be-evaluated data based on the target area(s) obtained in the optimizing method. The entry of to-be-evaluated data is related to one of the images, and is marked by a user (e.g., a less experienced trainer). The evaluating method includes steps 606 to 609.

In step 606, the processing module 3 receives the entry of to-be-evaluated data from the input module 1, where the entry of to-be-evaluated data includes at least one to-be-evaluated area respectively marked on at least one of the one or more objects included in the one of the images. Similar to the training areas, each of the at least one to-be-evaluated area is defined by at least two sets of to-be-evaluated coordinates. In response to receipt of the entry of to-be-evaluated data, in step 607, the processing module 3 determines, for each of the at least one to-be-evaluated area, whether a difference between the to-be-evaluated area and the target area that is associated with the object associated with the to-be-evaluated area is greater than the error range. To describe in further detail, the processing module 3 determines whether a difference between each of the at least two sets of target coordinates of the target area and each of the at least two sets of to-be-evaluated coordinates of the to-be-evaluated area is greater than the error range. For example, assuming that the target area has two sets of target coordinates, and that the to-be-evaluated area has two sets of to-be-evaluated coordinates, the processing module 3 determines whether a difference between the first set of target coordinates and the first set of to-be-evaluated coordinates is greater than the error range (e.g., equivalent to two pixels on the image), and determines whether a difference between the second set of target coordinates and the second set of to-be-evaluated coordinates is greater than the error range (e.g., equivalent to two pixels on the image). When determining that the difference is greater than the error range, the flow of the evaluating method proceeds to step 608; otherwise, the flow of the evaluating method proceeds to step 609.

In step 608, the processing module 3 outputs, using the output module 4, a correction message indicating that the corresponding one of the at least one to-be-evaluated area is marked inappropriately. The user may then adjust the corresponding one of the at least one to-be-evaluated area marked on the corresponding one of the one or more objects and attempt to reduce error in marking based on the correction message.

In step 609, the processing module 3 outputs, using the output module 4, an approval message indicating that the corresponding one of the at least one to-be-evaluated area is approved.

Figure 4:
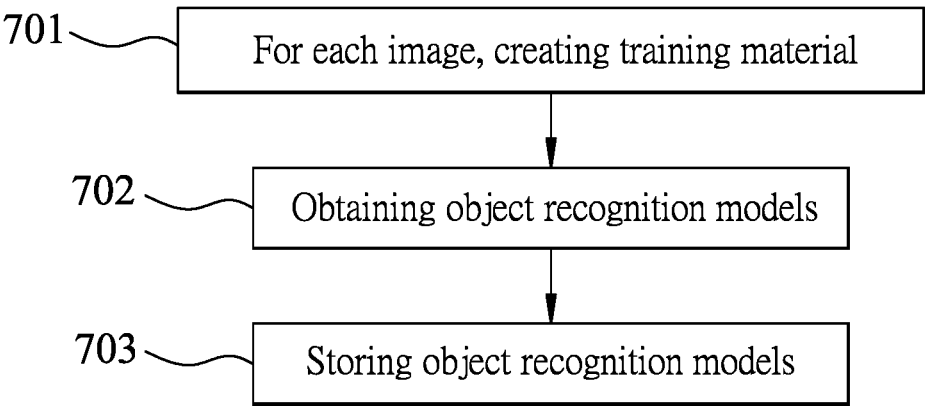
FIG. 4 is a flow chart of a building method for building an object recognition model according to an embodiment of the disclosure.

Further referring to FIG. 4, a building method for building an object recognition model is implemented to build a model for object recognition. The building method is to be performed after the optimizing method and a flow of the building method includes steps 701 to 703.

In step 701, the processing module 3 creates, for each image, a training material that includes the image, the training dataset that is related to the image, the at least one target area, and the at least one target property. The at least one target area is respectively associated with the at least one marked object included in the image, and the at least one target property is also respectively associated with the at least one marked object included in the image.

In step 702, the processing module 3 obtains at least three object recognition models based on the training materials using at least one machine learning algorithm, where the training materials are created respectively for the images in step 701. The at least one machine learning algorithm may include, but not limited to, at least one of CenterNet, You Only Look Once (YOLO), Region-based Convolutional Neural Networks (R-CNN), and/or Vision Transformer. In this embodiment, the at least three object recognition models are respectively obtained using different machine learning algorithms, but the disclosure is not limited to such. In some embodiments, the at least three object recognition models may be obtained using the same machine learning algorithm. For example, assuming that three object recognition models are obtained using YOLO (or R-CNN), the three object recognition models may be obtained by adjusting the weight of YOLO/R-CNN, resulting in each of the three object recognition models having a different weight of the machine learning algorithm, but the disclosure is not limited to such.

In step 703, the processing module 3 stores the at least three object recognition models that are obtained in step 702 in the storage medium 2.

Further referring to FIG. 5, a recognizing method for recognizing an object using the object recognition models is implemented to obtain recognition results for an input image. The recognizing method includes steps of 801 to 807.

In step 801, the processing module 3 loads the at least three object recognition models that are stored in the storage medium 2.

In step 802, the processing module 3 receives an input image through the input module 1.

In step 803, the processing module 3 inputs the input image into each of the at least three object recognition models so as to obtain at least three recognition results related to the input image respectively from the at least three object recognition models. Each one of the at least three recognition results includes at least one object area marked respectively on at least one to-be-recognized object in the input image and at least one object property respectively associated with the at least one to-be-recognized object. In this embodiment, the at least three recognition results are respectively obtained by using the at least three object recognition models that were respectively obtained using different machine learning algorithms. In some embodiments, the at least three recognition results may be respectively obtained by using the at least three object recognition models that were obtained using different combination of weights of the same machine learning algorithm.

In step 804, the processing module 3 obtains a number of the at least one to-be-recognized object based on the at least three recognition results. Since step 804 is performed similarly to step 601, it will not be describe in further detail for the sake of brevity.

In step 805, the processing module 3 obtains at least one group by grouping the object areas that are included in the at least three recognition results using the data clustering algorithm, and obtaining a number of the at least one group related to the object areas. It should be noted that the processing module 3 groups the object areas that are included in the at least three recognition results by using the DBSCAN based on the set of two parameters which is given another set of values.

In step 806, the processing module 3 determines whether the number of the at least one group that is related to the input image is equal to the number of the at least one to-be-recognized object that is included in the input image. When the processing module 3 determines that the number of the at least one group is equal to the number of the at least one to-be-recognized object, the flow of the recognizing method proceeds to step 807; otherwise, the flow of the recognizing method goes back to step 805, in which the processing module 3 obtains at least one group again by regrouping the object areas that are included in the at least three recognition results using the DBSCAN based on the set of two parameters which is given yet another set of two values, and then obtains another number of the at least one group thus obtained. Since steps 805 and 806 are performed similarly to steps 602 and 603, details of steps 805 and 806 will be omitted herein for the sake of brevity.

In step 807, for each one of the at least one group obtained most recently in step 806, the processing module 3 obtains a standard area that is associated with one of the at least one to-be-recognized object corresponding to the group based on the object areas that are grouped to the group, and obtains a standard property that is associated with the one of the at least one to-be-recognized object based on the object properties that are included in the at least three recognition results and that are associated with the one of the at least one to-be-recognized object. It should be noted that step 807 is performed similarly to steps 604 and 605, and will not be described in further detail for the sake of brevity.

Steps 801 to 803 of the recognizing method are related to obtaining recognition results, and steps 804-807 are related to processing of the recognition results to obtain the standard area and the standard property, which is similar to the optimizing method for processing the entries of training data to obtain the target area and the target property.

In summary, according to the disclosure, the processing module 3 is configured to execute the optimizing method that includes obtaining the at least one group by grouping the training areas that are included in the entries of training data, obtaining the number of the at least one group, and obtaining the at least one target area that are respectively associated with the at least one object respectively associated with the at least one group. As such, the training datasets may be processed and optimized (i.e., improved in quality) so as to build the object recognition model and make the object recognition model more accurate. Furthermore, an amount of the training materials used for building the object recognition model is relatively less, which makes building of the object recognition model more efficient. The processing module 3 is further configured to execute the evaluating method for evaluating the entry of to-be-evaluated data that is marked by the user. The processing module 3 is further configured to execute the building method for obtaining the at least three object recognition models using the at least one machine learning algorithm based on the training materials (i.e., the training datasets that have been processed), so as to obtain the object recognition models with high quality. The processing module 3 is further configured to execute the recognizing method that includes obtaining the recognition results of an input image based on the object recognition models, and obtaining the standard area and the standard property for each one of the at least one to-be-recognized object of the input image based on the recognition results. Since the standard area/property is obtained by taking a mode of the object areas/properties indicated by the object recognition results, the errors and uncertainties of the standard area/property may be minimized (i.e., improved in quality).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optimizing method for optimizing data to be used to train an object recognition model, the method to be implemented by a computing device that stores a plurality of entries of training data related to an image having one or more objects, each of the entries of training data including at least one training area respectively marked on at least one of the one or more objects included in the image, the method comprising steps of:

a) obtaining an object number of the one or more objects based on the entries of training data;

b) obtaining at least one group by grouping the training areas that are included in the entries of training data using a data clustering algorithm, and obtaining a group number of the at least one group;

c) determining whether the group number is equal to the object number; and d) when determining that the group number is equal to the object number, for each one of the at least one group, obtaining a target area based on the training areas that are grouped to the one of the at least one group, where the target area is associated with one of the one or more objects that corresponds to the training areas grouped to the one of the at least one group.

2. The optimizing method as claimed in claim 1, the computing device further storing an error range, the method further comprising steps, after step d), of:

in response to receipt of an entry of to-be-evaluated data related to the image, where the entry of to-be-evaluated data includes a to-be-evaluated area marked on one of the one or more objects, determining whether a difference between the to-be-evaluated area and the target area that is associated with the one of the one or more objects marked by the to-be-evaluated area is greater than the error range; and when determining that the difference is greater than the error range, outputting a correction message indicating that the corresponding one of the at least one to-be-evaluated area is marked inappropriately.

3. The optimizing method as claimed in claim 1, wherein, in step b), the data clustering algorithm is density-based spatial clustering of applications with noise (DBSCAN), and the computing device uses the DBSCAN to group the training areas that are included in the entries of training data based on a set of two parameters to obtain the at least one group, the set of two parameters including a radius and a minimum number of samples and being given a set of two values.

4. The optimizing method as claimed in claim 3, further comprising, when it is determined in step c) that the group number is not equal to the object number, steps of:

repeating step b) to obtain at least one group again by regrouping the training areas that are included in the entries of training data using the DBSCAN based on the set of two parameters which is given a different set of two values, and to obtain another group number of the at least one group thus obtained; and repeating step c) to determine whether the group number obtained most recently in step b) is equal to the object number, wherein, when it is determined in step c) that the group number is equal to the object number, step d) is implemented, for each of the at least one group obtained most recently in step b), to obtain a target area based on the training areas that are grouped to the one of the at least one group.

5. The optimizing method as claimed in claim 1, each of the at least one training area being defined by at least two sets of training coordinates, wherein step d) includes obtaining at least two sets of target coordinates based on the training coordinates corresponding to the training areas that are grouped to the one of the at least one group, and defining the target area based on the at least two sets of target coordinates.

6. The optimizing method as claimed in claim 1, each of the entries of training data further including at least one object property respectively associated with the at least one of the one or more objects included in the image, the method further comprising, after step d), a step of:

for each of the at least one of the one or more objects, obtaining a target property associated with the object based on the object properties that are included in the entries of training data and that are associated with the object.

7. The optimizing method as claimed in claim 1, wherein step a) includes:

obtaining, for each of the entries of training data, an area number of the at least one training area that is included in the entry of training data; and taking a mode of the area numbers respectively for the entries of training data as the object number.

8. A building method for building an object recognition model, the method to be implemented by a computing device that stores a plurality of training datasets respectively related to a plurality of images, each of the images having one or more objects, each one of the training datasets including a plurality of entries of training data related to one of the images that is related to the one of the training datasets, each of the entries of training data including at least one training area respectively marked on at least one of the one or more objects included in a corresponding one of the images, and at least one object property respectively associated with the at least one of the one or more objects included in the corresponding one of the images, the method comprising steps of, for each one of the images:

obtaining an object number of the one or more objects included in the image based on the entries of training data that are included in a corresponding one of the training datasets related to the image;

obtaining at least one group by grouping the training areas that are included in the entries of training data included in the corresponding one of the training datasets using a data clustering algorithm, and obtaining a group number of the at least one group that is related to the image;

determining whether the group number is equal to the object number;

when determining that the group number is equal to the object number, for each one of the at least one group that is related to the image, obtaining a target area based on the training areas that are grouped to the one of the at least one group related to the image, where the target area is associated with one of the one or more objects that corresponds to the training areas grouped to the one of the at least one group;

for each of the at least one of the one or more objects, obtaining a target property that is associated with the object based on the object properties that are included in the entries of training data included in the corresponding one of the training datasets and that are associated with the object; and creating a training material that includes the image, and the at least one target area and the at least one target property both respectively associated with the at least one of the one or more objects included in the image;

the method further comprising a step of obtaining at least three object recognition models based on the training materials that are created respectively for the images using at least one machine learning algorithm.

9. The building method as claimed in claim 8, wherein, in the step obtaining at least one group by grouping the training areas, the data clustering algorithm is density-based spatial clustering of applications with noise (DBSCAN), and the computing device uses the DBSCAN to group the training areas that are included in the entries of training data based on a first radius parameter and a first minimum number of samples to obtain the at least one group.

10. The building method as claimed in claim 9, further comprising steps of:

when determining that the amount of the at least one group is not equal to the amount of the at least one object, obtaining at least one group again by regrouping the training areas that are included in the entries of training data based on a second radius parameter and a second minimum number of samples, and obtaining an amount of the at least one group thus regrouped;

determining whether the amount of the at least one group thus regrouped is equal to the amount of the at least one object; and when determining that the amount of the at least one group thus regrouped is equal to the amount of the at least one object, for each of the at least one group thus regrouped, obtaining a target area based on the training areas that are regrouped to the one of the at least one group thus regrouped.

11. The building method as claimed in claim 8, each of the at least one training area being defined by at least two sets of training coordinates, wherein the step of obtaining the target area includes obtaining at least two sets of target coordinates based on the training coordinates corresponding to the training areas that are grouped to the one of the at least one group, and defining the target area based on the at least two sets of target coordinates.

12. The building method as claimed in claim 8, wherein the step of obtaining the amount of the at least one object includes obtaining, for each of the entries of training data, an amount of the at least one training area that is included in the entry of training data, and then taking a mode of the plurality of amount of the at least one training area thus obtained as the amount of the at least one object.

13. A recognizing method for recognizing an object, comprising a step of:

after receiving an input image, inputting the input image into each of the at least three object recognition models that are built according to the method of claim 8, so as to obtain at least three recognition results related to the input image respectively from the at least three object recognition models, where each one of the at least three recognition results includes at least one object area marked respectively on at least one to-be-recognized object included in the input image and at least one object property respectively associated with the at least one to-be-recognized object.

14. The recognizing method as claimed in claim 13, further comprising steps of, after the step of obtaining the at least three recognition results:

obtaining a number of the at least one to-be-recognized object based on the at least three recognition results;

obtaining at least one group by grouping the object areas that are included in the at least three recognition results using the data clustering algorithm, and obtaining a number of the at least one group related to the object areas; and when determining that the number of the at least one group related to the object areas is equal to the number of the at least one to-be-recognized object, for each one of the at least one group related to the object areas, obtaining a standard area that is associated with one of the at least one to-be-recognized object corresponding to the group based on the object areas that are grouped to the group, and obtaining a standard property that is associated with the one of the at least one to-be-recognized object based on the object properties that are included in the at least three recognition results and that are associated with the one of the at least one to-be-recognized object.

* * * * *